(12) United States Patent
Baruvoori et al.

(10) Patent No.: US 12,211,034 B2
(45) Date of Patent: Jan. 28, 2025

(54) VIRTUAL TERMINAL

(71) Applicant: Visa International Service Association, San Francisco, CA (US)

(72) Inventors: Rama Krishna Baruvoori, Dublin, CA (US); Shravya Reddy Mekala, Fremont, CA (US); Soorej Nair, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 7 days.

(21) Appl. No.: 18/044,848

(22) PCT Filed: Oct. 28, 2020

(86) PCT No.: PCT/US2020/057783
§ 371 (c)(1),
(2) Date: Mar. 10, 2023

(87) PCT Pub. No.: WO2022/093218
PCT Pub. Date: May 5, 2022

(65) Prior Publication Data
US 2023/0368190 A1    Nov. 16, 2023

(51) Int. Cl.
*G06Q 20/00* (2012.01)
*G06Q 20/38* (2012.01)

(52) U.S. Cl.
CPC ..... *G06Q 20/3823* (2013.01); *G06Q 20/3821* (2013.01); *G06Q 20/3825* (2013.01); *G06Q 20/3829* (2013.01)

(58) Field of Classification Search
CPC ........... G06Q 20/3823; G06Q 20/3821; G06Q 20/3825; G06Q 20/3829; G06Q 20/10;
(Continued)

(56) References Cited

U.S. PATENT DOCUMENTS

| 9,141,412 B2 | 9/2015 | Kushwaha et al. |
| 10,354,244 B2 | 7/2019 | Zhang et al. |

(Continued)

FOREIGN PATENT DOCUMENTS

| CN | 105701406 A | 6/2016 |
| WO | 2019195144 A1 | 10/2019 |

OTHER PUBLICATIONS

EP20960132.7, "Extended European Search Report", Nov. 7, 2023, 8 pages.
(Continued)

*Primary Examiner* — Dante Ravetti
(74) *Attorney, Agent, or Firm* — Kilpatrick Townsend & Stockton LLP (57) ABSTRACT

A method is disclosed. The method comprises receiving, by a virtual terminal, virtual terminal configuration data from a virtual terminal configuration data source via a virtual terminal configurations API. The method also includes transmitting, by virtual terminal, to a device reader, a value, and receiving, by the virtual terminal, access data from a user device via the device reader. The method further includes transmitting, by the virtual terminal, a transaction request comprising at least the value and the access data to a transaction platform via a transaction API, and receiving, by the virtual terminal, a transaction response from the transaction platform via the transaction API.

17 Claims, 5 Drawing Sheets

(58) Field of Classification Search
CPC .. G06Q 20/204; G06Q 20/34; G06Q 20/4097; G06Q 20/32; H04L 2209/56; H04L 9/3213; H04L 9/3247
See application file for complete search history.

(56) References Cited

U.S. PATENT DOCUMENTS

| | | |
|---|---|---|
| 2007/0005685 A1 | 1/2007 | Chau et al. |
| 2013/0332293 A1 | 12/2013 | Ran |
| 2015/0287031 A1 | 10/2015 | Radu et al. |
| 2016/0057619 A1* | 2/2016 | Lopez ................ G06Q 20/3829 380/247 |
| 2017/0039557 A1 | 2/2017 | Murphy |
| 2018/0150816 A1 | 5/2018 | Liu et al. |
| 2019/0080312 A1 | 3/2019 | Yeager et al. |
| 2020/0057671 A1* | 2/2020 | Bailey ................ G06F 12/0815 |
| 2020/0074514 A1 | 3/2020 | Feldpusch |
| 2020/0286071 A1 | 9/2020 | Oepping |

OTHER PUBLICATIONS

PCT/US2020/057783, "International Search Report and Written Opinion", Jul. 26, 2021, 10 pages.

\* cited by examiner

VIRTUAL TERMINAL

CROSS-REFERENCES TO RELATED APPLICATIONS

None.

BACKGROUND

Current methods and systems require significant updates to virtual terminals even when small changes are made to the virtual terminals or any SDKs (software development kits) associated with the virtual terminals. For example, even a small change to a user interface of the virtual terminal necessitates updating (and re-downloading) the entire virtual terminal or its associated SDK. This is problematic and inconvenient.

Embodiments of the invention are directed to addressing these and other problems, individually and collectively.

BRIEF SUMMARY

One embodiment can include a method. The method comprises receiving, by a virtual terminal, virtual terminal configuration data from a virtual terminal configuration data source via a virtual terminal configurations API; transmitting, by virtual terminal, to a device reader, a value; receiving, by the virtual terminal, access data from a user device via the device reader; transmitting, by the virtual terminal, a transaction request comprising at least the value and the access data to a transaction platform via a transaction API; and receiving, by the virtual terminal, a transaction response from the transaction platform via the transaction API.

Another embodiment includes a system. The system comprises a computer; a virtual terminal in or accessible to the computer; and a plurality of APIs in communication with the virtual terminal, the plurality of APIs including a configurations API and a transaction API.

Another embodiment of the invention includes a system. The system comprises: a resource provider computer comprising one or more processors, one or more non-transitory computer readable medium, the one or more non-transitory computer readable medium comprising instructions which can be executed by the one or processors to: receive, by a virtual terminal, virtual terminal configuration data from a virtual terminal configuration data source via a virtual terminal configurations API; transmitting, by virtual terminal, to a device reader, a value; receiving, by the virtual terminal, access data from a user device via the device reader; transmitting, by the virtual terminal, a transaction request comprising at least the value and the access data to a transaction platform via a transaction API; and receiving, by the virtual terminal, a transaction response from the transaction platform via the transaction API.

Further details regarding embodiments of the invention can be found in the Detailed Description and the Figures.

DETAILED DESCRIPTION

Embodiments of the invention include a method of isolating transaction processing functionalities when conducting in-store and online transactions using a virtual terminal via a plurality of APIs. The plurality of APIs may include APIs for at least modifying a user interface of the virtual terminal, provisioning a token for a transaction, and processing an authorization of the transaction.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be any suitable device that can be used by a user. User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component. In other embodiments, a "user device" may be a payment device such as credit, debit, or stored value card.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose.

A "token" may be a substitute value for a credential. An "access token" may be a token used to access something. A token may be a string of numbers, letters, or any other suitable characters. Examples of tokens include access tokens (e.g., payment tokens), personal identification tokens, etc.

A "token provider computer" can include a system that services tokens. In some embodiments, a token provider computer can facilitate requesting, determining (e.g., generating) and/or issuing tokens, as well as maintaining an established mapping of tokens to primary account numbers (PANs) in a repository (e.g. token vault). In some embodiments, the token provider computer may establish a token assurance level for a given token to indicate the confidence level of the token to PAN binding. The token provider computer may include or be in communication with a token vault where the generated tokens are stored. The token provider computer may support token processing of payment transactions submitted using tokens by de-tokenizing the token to obtain the actual PAN. In some embodiments, a token provider computer may include a tokenization computer alone, or in combination with other computers such as a processing network computer. Various entities of a tokenization ecosystem may assume the roles of the token service provider. For example, payment networks and issuers or their agents may become the token service provider by implementing the token services according to embodiments of the present invention.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "token request message" may be an electronic message that requests a token. In some embodiments, a token request message may comprise a token requestor identifier, and an address to a token provider computer.

A "token response message" may be an electronic message reply to a token request message. A token response message may include at least one or more tokens, an address of the token requestor device requesting the token, etc.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair generation algorithm.

A "payment processing network" may include data processing subsystems, networks, server computers and operations used to support and deliver authorization services, exception file services, and clearing and settlement services. The payment processing network (130) may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions.

"Transaction data" may be data that is associated with a payment transaction. Transaction data may include a value such as a transaction amount, a date of a transaction, a primary account number associated with a user initiating the transaction.

An "application programming interface" ("API") may be an interface that can facilitate an interaction between software applications and/or systems. In some embodiments, APIs may facilitate interactions using HTTP messages. APIs may additionally be specialized to have specific functionalities. For example, a first API may be configured to perform a first function (e.g., data transfer) between a first application and a second application. As another example, a second API may be configured to perform a second function (e.g., such as data formatting) between the first application and the second application. Systems and devices described herein may have a plurality of APIs.

An "software development kit" (referred to as an "SDK" herein) may be a set of libraries and/or software tools that can be used to form applications. An SDK may also be considered an application that performs certain predetermined functions when implemented on a computer.

A "virtual terminal" can include an application that allows users to access information or a resource from another host processor for transaction processing. A "virtual terminal" may not be restricted to be located within a single location since it is virtual. Also, a "virtual terminal" may be interchangeably referred to as a "virtual terminal application."

"Virtual terminal configuration data" may be data used to configure a virtual terminal. Exemplary virtual terminal configuration data may include both visual and transaction processing settings. Visual settings may involve configurations a user interface of the virtual terminal, such as how the virtual terminal displays transaction data, data fields, and/or a receipt. Transaction processing settings may involve configurations for retrieving data for transactions, such as determining which of a plurality of transaction data elements (e.g., such as a product name, a mobile phone number, an email, a shipping address, etc.) is requested by the virtual terminal from a user for completing the transaction.

"Access data" may include any suitable data that can be used to access a resource or create data that can access a resource. In some embodiments, access data may be account information for a payment account. Account information may include a credential such as a PAN (primary account number), an access token such as a payment token, expiration date, verification values (e.g., CVV, CVV2, dCVV, dCVV2), etc. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

"Credentials" may comprise any evidence of authority, rights, or entitlement to privileges. For example, "access credentials" may comprise permissions to access certain tangible or intangible assets, such as a building or a file. Examples of credentials may include passwords, passcodes, or secret messages. In another example, "payment credentials" may include any suitable information associated with and/or identifying an account (e.g., a payment account and/or payment device associated with the account). Such information may be directly related to the account or may be derived from information related to the account.

Embodiments of the invention are directed to a system and a method of processing a transaction using a virtual terminal that is in communication with a plurality of APIs, wherein the virtual terminal can include a secure Web browser. Specifically, embodiments can enable a resource provider (e.g., a merchant, a transit operator, a secure building access organization, etc.) to operate a virtual terminal that is hosted by a resource provider computer (e.g., a merchant computer, a transit operator computer, a secure building access organization computer, etc.) and automatically, via a device reader, enter credentials for a user to process the transaction. Embodiments can further be used for in-store transactions, wherein the merchant may use a personal computer (PC) or another mobile device that is not a conventional POS terminal to process one or more transactions.

According to embodiments, prior to initiating a transaction, the virtual terminal may be modified according to one or more virtual terminal configurations via a virtual terminal configuration API. The one or more virtual terminal configurations may be set by a merchant operating the virtual terminal. Upon initiation of a transaction between the merchant and a user, the virtual terminal may receive payment credentials from the user. The virtual terminal may transmit these payment credentials to a token provider computer via a token service API that can tokenize the payment credentials into a token. The virtual terminal may then transmit the token along with transaction details for the transaction to a payments platform via a transaction API. The payments platform may then process an authorization of the transaction and notify the virtual terminal if the transaction was approved or not, via the transaction API.

Figure 1:
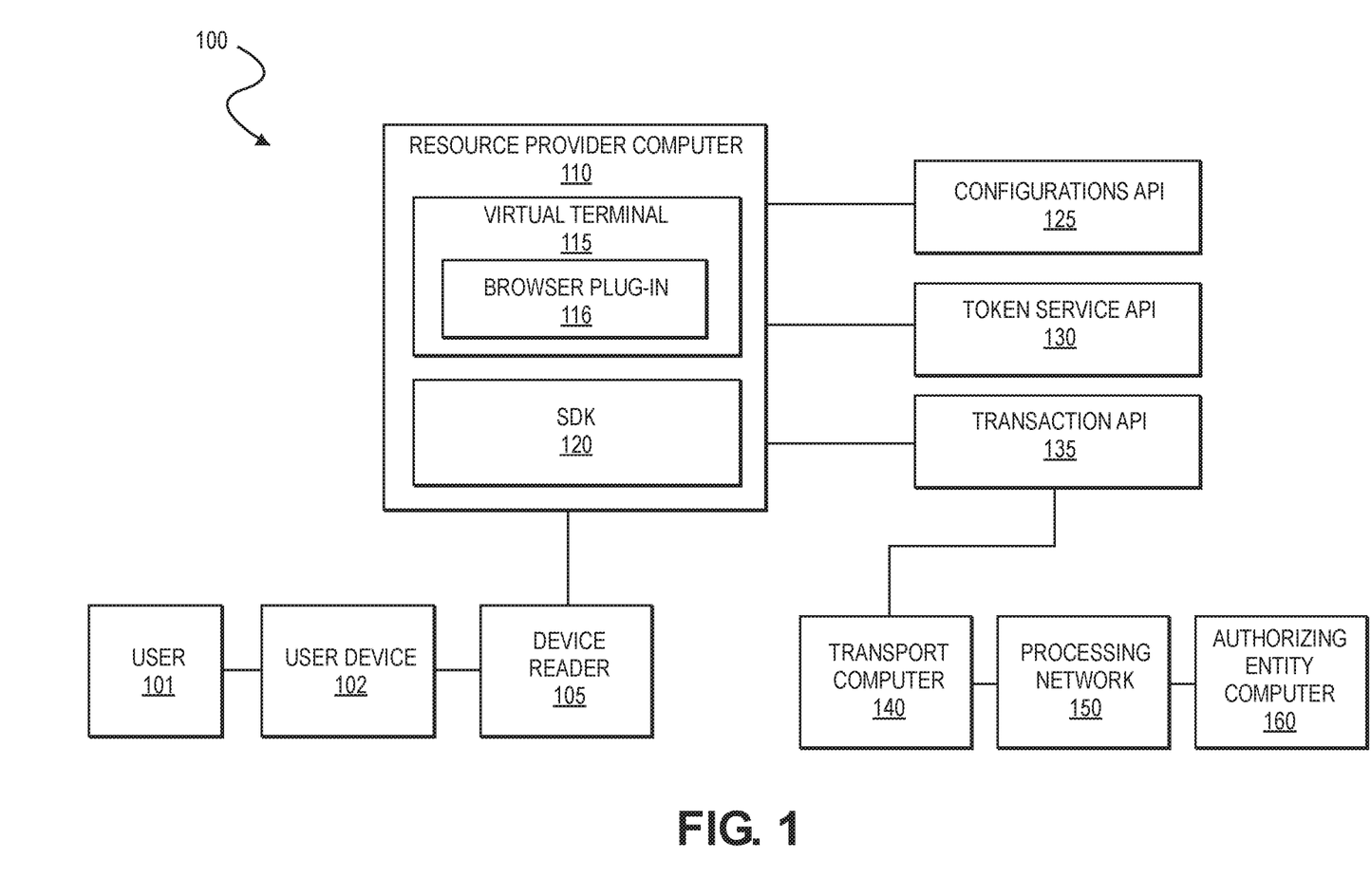
FIG. 1 shows a block diagram of a transaction system using the virtual terminal according to an embodiment of the invention.

FIG. 1 shows a transaction processing system 100 that uses a virtual terminal 115, according to an embodiment of the present disclosure. The system 100 comprises a user device 102, a device reader 105, a resource provider computer 110, an transport computer 140, a processing network computer 150, and an authorizing entity computer 160. The user device 102 may be operated by a user 101, while the resource provider computer 110 may be operated by a resource provider, such as a merchant. Each of the components shown in FIG. 1 may be in operative communication with each other.

The components in the system in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Referring to FIG. 1, user 101 may wish to initiate a transaction to obtain a resource such as a good and/or service offered by a resource provider, access to a secure location, access to secure data, etc. In embodiments, the resource provider may not have access to a standard POS terminal. In order to initiate the transaction, the user 101 may initiate an interaction between user device 102 and device reader 105. In some embodiments, user 101 may initiate the interaction by accessing a Web browser of a virtual terminal 115 that is stored on the resource provider computer 110. In the case of a payment transaction, the user 101 may enter one or more transaction details, such as a name, a billing address, and a product selection into the Web browser of virtual terminal 115. Upon entry of the transaction details, user 101 may be prompted to provide an access credential stored on user device 102 to device reader 105.

User device 102 may be configured to establish a communication session with resource provider computer 110 via the device reader 105. In some embodiments, the user device 102 may also be either physical (e.g., swiping or inserting the user device 102) or proximal (e.g., via contactless methods) contact via device reader 105. In embodiments, the user device 102 may be configured to transmit at least an access credential to device reader 105 and/or resource provider computer 110. In some embodiments, an APDU messaging-protocol comprising a series of messages may be used between the user device 102 and the device reader 105 when a transaction is conducted. In some embodiments, the access credential is a payment credential, such as a primary account number (PAN).

In embodiments, device reader 105 may be connected to resource provider computer 110, and may include one or more radio frequency (RF) antennas, optical scanners, bar code readers, QR code readers, NFC readers, magnetic stripe readers, and/or the like, configured to interact with user devices. In some embodiments, device reader 105 may be configured to receive the access credential from user device 102; encrypt the payment credentials using an encryption key; and forward the encrypted access credential to the resource provider computer 110.

Resource provider computer 110 may be configured to perform the functionalities of a typical POS terminal. In some embodiments, resource provider computer 110 may be a mobile phone, a personal computer (PC), a PDA, a wearable device, and the like. The resource provider computer 110 may further comprise a virtual terminal 115 and an SDK 120. The virtual terminal 115 may be configured to request and receive transaction data from a secure user interface (e.g., a Web browser) based on one or more virtual terminal configurations and process transactions based on the received transaction data. The virtual terminal 115 may include a Web browser element (not pictured in figure) for collecting data from user 101 and a browser plug-in 116 which may be configured to perform one or more functions for displaying or processing data on the Web browser. In some embodiments, the browser plug-in 116 may be configured to display a plurality of data fields on the Web browser of the virtual terminal 115, wherein the plurality of data fields may prompt the user 101 for transaction details during initiation of the transaction.

The SDK 120 may be an application with a set of libraries, a software framework, or hardware-specific elements that can be integrated into the virtual terminal 115. In embodiments, the SDK 120 may specifically be configured to receive the encrypted access credential from the device reader 105, decrypt the encrypted access credential, and forward the decrypted access credential to browser plug-in 116. In other embodiments, the SDK 120 may re-encrypt the access credential using an encryption key (e.g., a public key corresponding to a secret key held by the browser plug-in 116 or some other downstream entity), and then forward the encrypted access credential to browser plug-in 116. In still other embodiments, the SDK 120 does not decrypt the encrypted access credential received from the device reader 105, but instead further encrypts the encrypted access credential using its own encryption key.

In some cases, the SDK 120 may also sign an access credential or an encrypted access credential with a private key. The browser plug-in 116 may not pass on any credentials (encrypted or unencrypted) to the virtual terminal 115 and/or the token service API or transaction API 135, or even receive them, until the browser plug-in 116 validates the digital signature of the SDK 120. This can protect the credentials or encrypted credentials from a malicious party that may seek to obtain the credentials or encrypted credentials the browser plug-in 116.

In some embodiments, the browser plug-in 116 or any entity (e.g., the virtual terminal 115, the token service API 130, the transaction API 135, etc.) downstream from the browser plug-in 116 may receive the encrypted or multiple encrypted access credential from SDK 120, and can decrypt any encrypted or multiple encrypted access credential using one or more appropriate cryptographic keys. The browser plug-in 116 can also validate a digital signature of the encrypted access credential using a corresponding public encryption key. Upon validating the digital signature of the encrypted access credential, browser plug-in 116 may be configured to format the access credential. In some embodiments, the browser plug-in 116 may display the formatted access credential (or portion thereof) and the transaction details to user 101 and prompt the user 101 to confirm the transaction prior to virtual terminal 115 proceeding with the transaction. The private and public encryption keys described herein may be part of an RSA asymmetric public-private key cryptosystem.

The resource provider computer 110 may also be in communication with a plurality of APIs such as a configurations API 125, a token service API 130, and a transaction API 135. Each of the plurality of APIs may be configured to facilitate interactions between the virtual terminal and another application and/or the virtual terminal and a server computer.

The configurations API 125 may be a API that is programmed with instructions to communicate with a virtual terminal configurations application (not shown in figure) stored on the resource provider computer 110. In embodiments, the configuration API may provide one or more virtual terminal configurations stored on the virtual terminal configurations application. The one or more virtual terminal configurations may include configurations for providing a confirmation that a transaction has been completed (e.g., printing a receipt). In some embodiments, the one or more virtual terminal configurations may also include configurations for browser plug-in 116, such as determining a plurality of data fields that may be displayed on a Web browser of the virtual terminal during initiation of the transaction. For example, at least one of the virtual terminal configurations may involve prompting user 101, on the Web browser, for a name, an address, an email and/or a mobile phone number.

The token service API 130 and the transaction API 135 may be web APIs programmed with instructions to communicate with one or more server computers using HTTP messages.

In some embodiments, the token service API 130 may be configured to receive a token request comprising the access credential from the virtual terminal 115 and transmit the token request to a token provider computer (not shown in the figure) in order to tokenize the access credential. The token service API 130 may then receive a token for the access credential and provide the payment token to the virtual terminal. In some embodiments, the token is a payment token. In some embodiments, the token service API 130 may be in communication with transaction API 135, wherein the transaction API 135 transmits the token request comprising access credential to the token provider computer via the token service API 130.

The transaction API 135 may be in communication with one or more payment processing computers, such as transport computer 140, processing network computer 150, and/or authorizing entity computer 160. The transaction API 135 may be configured to receive an access credential (or token) and transaction details, such as a transaction amount from the virtual terminal 115; generate a transaction request comprising the received access credential (or token) and the transaction details; and transmit the transaction request to one of the payment processing computers. For example, the transaction API 135 may be configured to transmit the transaction request to transport computer 140 (e.g., an acquirer computer). The transaction API 135 may then later receive a transaction response from one of the payment processing computers (e.g., transport computer 140) that indicates a transaction was approved.

The transport computer 140 may be associated with an acquirer, which may typically be a business entity (e.g., a commercial bank) that has a business relationship with a particular merchant or other entity. The transport computer 140 may receive the transaction request and generate an authorization request message comprising at least the transaction amount and the access credential. The authorization request message may then be transmitted to authorizing entity computer 160. In some embodiments, the authorization request message may be transmitted to authorizing entity computer 160 via processing network computer 150.

The processing network computer 150 may be disposed between (in an operational sense) the transport computer 140 and the authorizing entity computer 160. The processing network computer 150 may include data processing subsystems, networks, and operations used to support and deliver authorization services, exception file services, and clearing and settlement services. For example, the processing network computer 150 may comprise a server coupled to a network interface (e.g., by an external communication interface), and databases of information. The processing network computer 150 may be representative of a payment processing network. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing network computer 150 may use any suitable wired or wireless network, including the Internet.

The authorizing entity computer 160 may be associated with an issuer, which may typically be an entity, such as a financial institution, that issued the payment credentials to user 101 and manages a financial account of the user 101. The authorizing entity computer 160 may receive an authorization request message and then approve or deny the transaction by determining if an account associated with the access credential has a sufficient amount of funds. The authorizing entity computer 160 may additionally generate an authorization response message based on this determination. The authorization response message may then be transmitted via the transport computer 140 and the processing network computer 150 to the resource provider computer 110 via the transaction API 135.

The processing network computer 150, the transport computer 140, and the authorizing entity computer 160 may operate suitable routing tables to route authorization request messages and/or authorization response messages using payment credentials, merchant identifiers, or other account identifiers.

In response to the resource provider computer 110 receiving an authorization response message that indicates a transaction has been approved via transaction API 135, the resource provider computer 110 may then notify user 101 that the transaction has been authorized and the resource provider may provide access to the desired good or resource.

Using the transaction API 135, the authorization process for each transaction has been isolated from the other functionality of resource provider computer 110. The authorization process may then be modified by updating the transaction API 135, with no effect on the resource provider computer 110 and/or any of its other functionalities. Exemplary modifications may include performing one or more validity checks of the authorization request message.

Figure 2:
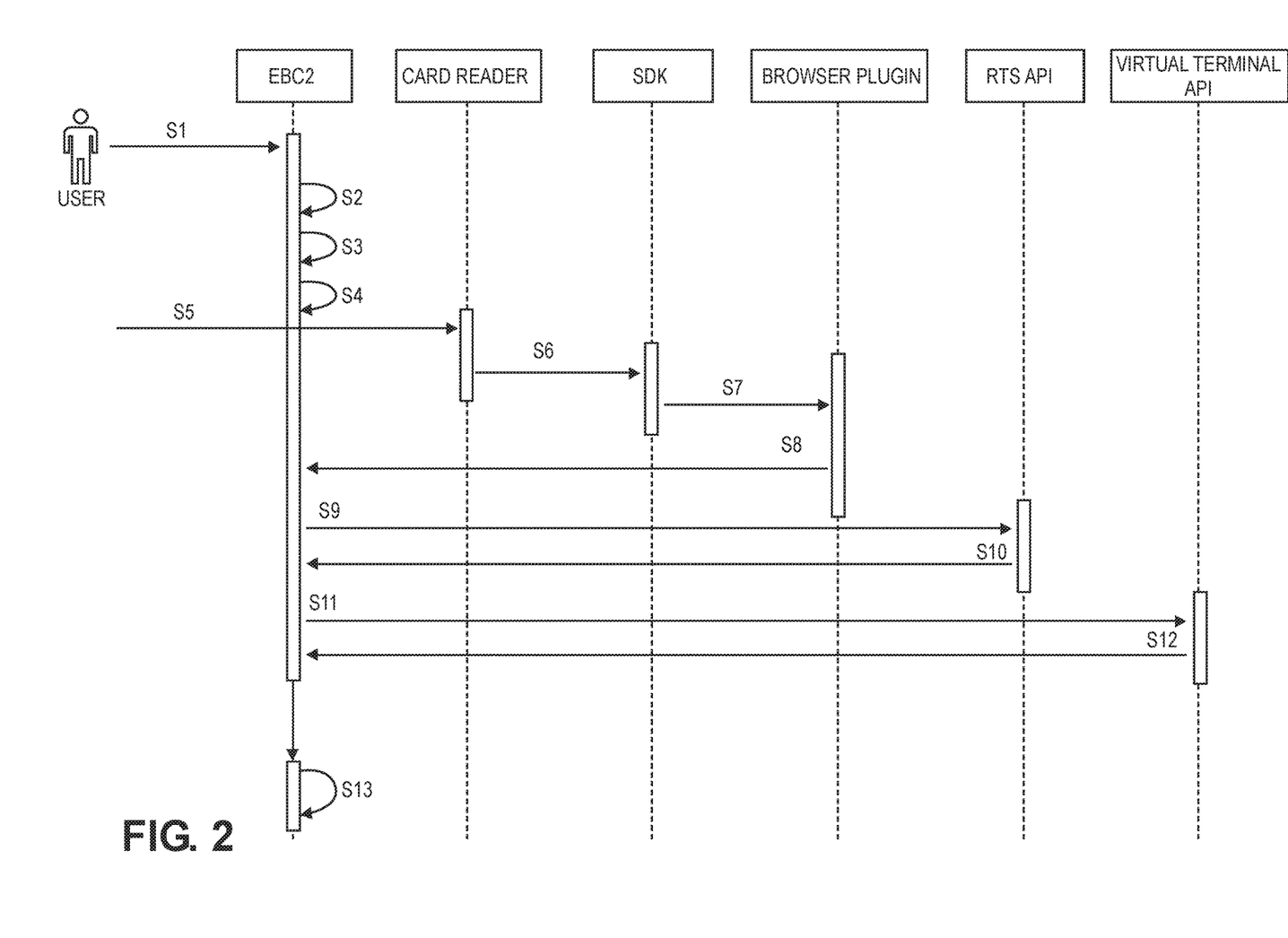
FIG. 2 shows a swim lane diagram of processing a transaction using the virtual terminal, according to one embodiment of the invention.

FIG. 2 shows a swim lane diagram for conducting a transaction using the virtual terminal transaction system described in FIG. 1.

At step S1, a user may log in to a merchant portal and/or access a merchant application. In some embodiments, the merchant portal and/or merchant application may be an EBC2 (enterprise business center) application which includes a virtual terminal and is associated with a merchant.

At step S2, the user may access the virtual terminal included within the EBC2 application. In embodiments, the virtual terminal may include a Web page. In some embodiments, the user may access the virtual terminal in order to initiate a transaction for a good and/or service. In some embodiments, the transaction may be an in-store transaction. In other embodiments, the transaction may be an online transaction. In some embodiments, accessing the virtual terminal further includes loading in one or more virtual terminal configurations via a virtual terminal configurations API. The one or more virtual terminal configurations may be reloaded every time a transaction is initiated.

At step S3, the EBC2 application may display a plurality of data fields, and the user may be prompted to provide one or more transaction details into the plurality of data fields. Transaction details may include a transaction amount, a product name, a product quantity, and/or a consumer billing address.

At step S4, for embodiments in which a user is performing an in-store transaction, the user may then be prompted to initiate communication between a payment device and a device reader that is in operative communication with the EBC2 application. In some embodiments, the payment device may be a payment card and initiating communication involves inserting (or swiping or tapping) the payment card into the device reader.

At step S5, the user may insert (or swipe or tap) the payment card into the device reader. The device reader may then retrieve payment credentials from the payment card. The device reader may also encrypt the payment credentials using a symmetric or an asymmetric cryptographic key.

At step S6, the device reader transmits the encrypted payment credentials to an SDK. In some embodiments, the SDK may be configured to decrypt the encrypted payment credentials using a corresponding symmetric or an asymmetric cryptographic key. In other embodiments, the SDK may also be configured to re-encrypt the payment credentials or further encrypt the encrypted payment credentials using an appropriate cryptographic key.

For embodiments in which an online or remote transaction is performed, steps S5-S6 may be omitted. In these embodiments, the user may instead manually enter payment credentials (e.g., such as PAN, expiry date, etc.) into one of the plurality of data fields displayed by the EBC2 application, and the EBC2 application transmits the payment credentials to the SDK. In some embodiments, the EBC2 application may encrypt the payment credentials with a symmetric or asymmetric cryptographic key prior to transmitting the payment credentials to the SDK. In some embodiments, the SDK may still decrypt the encrypted payment credentials with a corresponding symmetric or asymmetric cryptographic key. The SDK may also sign any credentials or encrypted payment credentials with a private cryptographic key.

At step S7, the SDK transmits the payment credentials to a browser plug-in of the virtual terminal. If the payment credentials (encrypted or unencrypted) have been signed with a private key of the SDK, then the browser plug-in, or any entity downstream of the browser plug-in, may validate the digital signature of the encrypted payment credentials using a corresponding public key. The browser plug-in can validate the digital signature, before performing any additional processing of the payment credentials. If the digital signature is validated, the browser plug-in may then format the payment credentials. Formatting the payment credentials may include populating one or more data fields within a JSON file with the decrypted payment credentials. If the payment credentials have been encrypted by a cryptographic key associated with the SDK, then the browser or browser plug-in may decrypt them with a corresponding cryptographic key.

At step S8, the browser plug-in transmits the formatted payment credentials to the EBC2 application. In some embodiments, responsive to receiving the formatted payment credentials, the EBC2 application may transmit a token request comprising the payment credentials to a token provider computer via a token API (not shown in the figure). The token provider computer may then provision a payment token for the payment credentials and transmit a token response comprising the provisioned payment token to the EBC2 application. In such embodiments, the EBC2 application may then use the payment token in later steps as a replacement for the payment credentials. In some embodiments, if the payment credentials are encrypted when they are received by the EBC2 application, the EBC2 application can decrypt any credentials from the SDK using one or more appropriate cryptographic keys before it formats them.

At step S9, the EBC2 application may then make a call to a transaction API (the RTS API). In embodiments, the call may include a transaction request comprising at least the formatted payment credentials and the one or more transaction details. In some embodiments, the transaction request may comprise at least a payment token provisioned for the payment credentials and the one or more transaction details. In some embodiments, the transaction API may be a REST payment service API (e.g., such as RTS API). In embodiments where the transaction request comprises payment credentials, the transaction API may be in communication with a token provider computer and the transaction API may instead transmit a token request comprising the payment credentials to the token provider computer. The token provider computer may then provision a payment token for the payment credentials and transmit a token response comprising the payment token to the transaction API. In such embodiments, the transaction API may then use the payment token to process the transaction.

In embodiments, the transaction API may also be configured to perform an authorization process for the transaction. The authorization process may include generating, by the transaction API, an authorization request message using the formatted payment credentials (or the payment token) and the one or more transaction details. In some embodiments, the authorization request message may be in an ISO message format. The transaction API may then transmit the authorization request message to an issuer computer via an acquirer computer and (optionally) a processing network computer. If a payment token is transmitted, then one of these entities may obtain a real payment credential from the payment token before performing additional authorization processing.

The issuer computer may then determine if a user has a sufficient balance and/or funds to complete the transaction and generate an authorization response message based on this determination. The authorization response message may be in an ISO message format. The issuer computer may then transmit the authorization response message to the transaction API.

At step S10, the transaction API may send a transaction response message comprising at least the transaction details and an indicator for whether the transaction was authorized or not to the EBC2 application.

At step S11, the EBC2 application may then transmit the transaction details to a virtual terminal (VT) API. The virtual terminal API may be configured to perform post-transaction processing with the received transaction details. Post-transaction processing may include formatting the transaction details into a receipt format that can be printed and/or displayed to a user. In some embodiments, post-transaction processing may include displaying a confirmation that the transaction was completed.

At step S12, the virtual terminal API may transmit the processed transaction details (e.g., in the form of a receipt) to the EBC2 application. At step S13, the EBC2 application may then display the receipt or print the receipt for the user. The user may then be granted access to the desired good and/or service.

At a later time, a clearing and settlement process can be performed between the transport computer 140, the processing network computer 150, and the authorizing entity computer 160.

Figure 3:
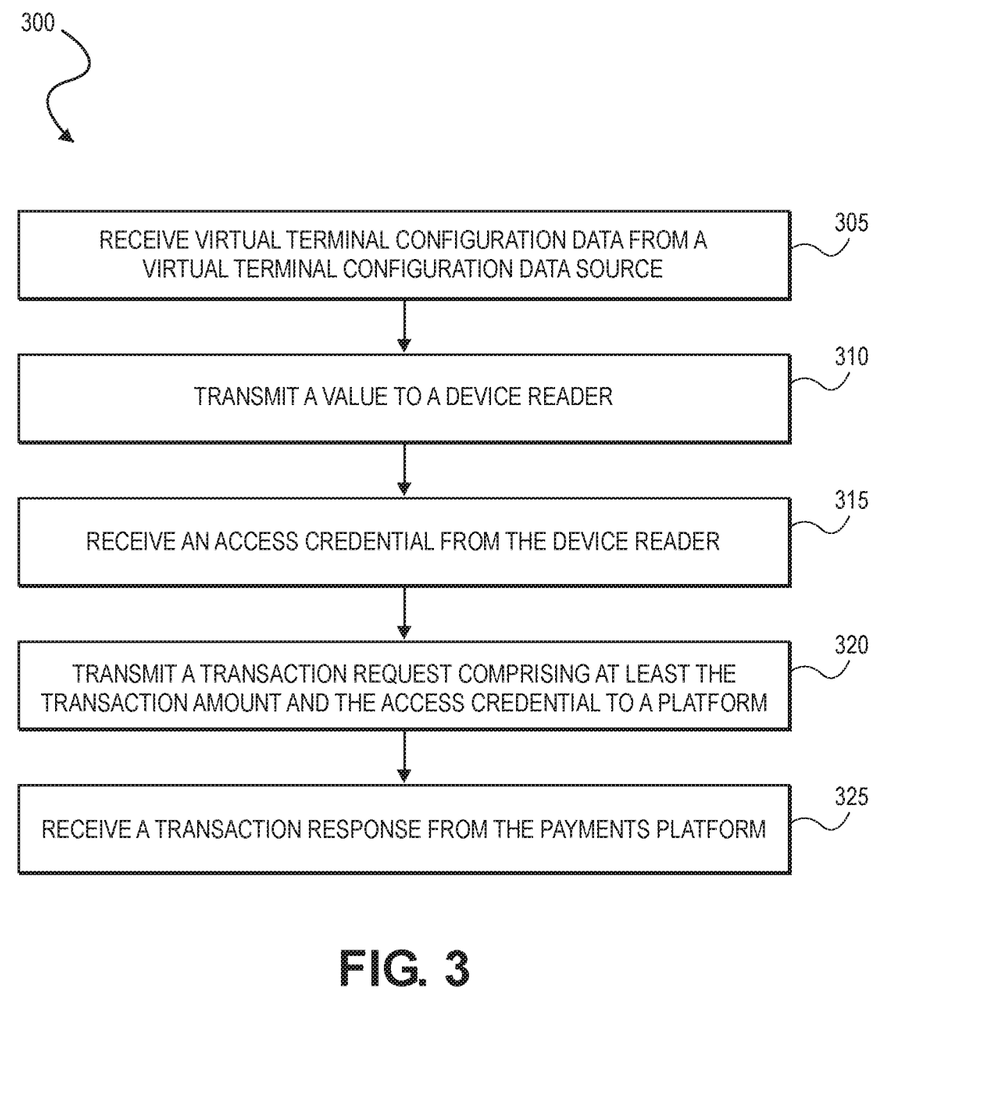
FIG. 3 shows a flowchart diagram for processing a transaction using the virtual terminal, in accordance with embodiments of the invention.

FIG. 3 shows an exemplary process 300 for conducting a transaction using a virtual terminal operated by a resource provider (e.g., a merchant). In embodiments, the process 300 is performed by the virtual terminal.

At block 305, the virtual terminal receives virtual terminal configuration data from a virtual terminal configuration data source. The virtual terminal configuration data source may be a configurations application stored on the resource provider computer. Virtual terminal configuration data may include one or more settings for collecting fees (e.g., such as a fee amount) and providing receipts to a consumer. For example, a virtual terminal may be configured to prompt entry of a consumer's email upon initiation of the transaction, and then send a receipt of the transaction (e.g., after the transaction has been completed) that includes a product name, a transaction amount, a payment method to the entered email. As another example, the virtual terminal may instead be configured to display a receipt of the transaction on the resource provider computer.

In some embodiments, the virtual terminal configuration data may be related to a user interface of the virtual terminal.

For example, a virtual terminal may be configured to display a certain amount of data fields and/or display the plurality of data fields in a particular order. As another example, a merchant may decide to modify the virtual terminal via a configuration to add or remove a data field.

At block 310, the virtual terminal then transmits a value such as a transaction amount to a device reader. The device reader may be in communication (e.g., such as NFC or short-range communication) with the virtual terminal. In some embodiments, the device reader may be a device that is attached to the resource provider computer. In other embodiments, the device reader may be a device that is separate from the resource provider computer, but can communicate information to the resource provider computer. In some embodiments, the device reader may include a user interface that can display the received transaction amount.

Responsive to the virtual terminal transmitting the transaction amount to the device reader, a consumer may initiate an interaction between a user device and the device reader. The user device may be a credit or debit card or a mobile phone that stores an access credential of the consumer. The interaction may include swiping or inserting, or tapping the user device into the device reader. In embodiments in which the user device is a credit or debit card, the device reader may include at least a magnetic stripe reader and/or a chip card reader and retrieve the access credential from the credit or debit card from either a track of the magnetic stripe element or a chip element of the card. The device reader transmits the retrieved access credential to the virtual terminal. In some embodiments, the access credential may be a PAN. In other embodiments, the access credential may be a user identifier or login credentials.

At block 315, the virtual terminal receives an access credential from the device reader. The virtual terminal may receive the access credential using at least a SDK and/or a browser plug-in of the virtual terminal. In some embodiments, the access credential may be modified into another format (e.g., such as a JSON file or another suitable data file format) by the SDK and/or the browser plug-in.

At block 320, the virtual terminal transmits a transaction request comprising at least the transaction amount and the access credential to a platform such as a payments platform, wherein the payments platform may be configured to perform an authorization of the transaction. Transmitting the transaction request to the payments platform may include using at least an transaction API. The transaction API may be in communication with the payments platform, and may be configured to at least generate an authorization request message for the transaction using the contents of the transaction request and transmit the authorization request message to the payments platform. In other embodiments, the transaction API only forwards the transaction request to the payment platform, and the payments platform instead generates the authorization request message.

In embodiments, the payment platform includes an acquirer computer associated with the merchant. In other embodiments, the payment platform may be a separate payment processing computer that can generate the authorization request message for the transaction using the transaction request and then transmit the authorization request message to the acquirer computer associated with the merchant. In such embodiments, the transaction request may additionally comprise an acquirer identifier or a merchant identifier that indicates a destination for the authorization request message.

Responsive to the acquirer computer receiving the authorization request message, the authorization request message is then transmitted to an issuer computer via (optionally) a payment processing network. The issuer computer may then validate the received access credentials and determine whether or not to authorize a transaction. The issuer computer may then generate an authorization response message based on this determination and transmit the authorization response message to an acquirer computer via (optionally) the payment processing network.

The acquirer computer may then generate a transaction response based on the authorization response message. The transaction response may comprise an authorization indicator (e.g., positive or negative) and transaction details. In embodiments in which the acquirer computer is the payments platform, the acquirer computer transmits the transaction response to the virtual terminal. In other embodiments, the acquirer computer transmits the transaction response to the respective payments platform, and the payments platform forwards the transaction response to the virtual terminal.

At block 325, the virtual terminal receives a transaction response from the payments platform. In some embodiments, the transaction response may be received via the same transaction API for the payments platform. The virtual terminal may extract at least the authorization indicator included within the transaction response and determine if the transaction was authorized based on the authorization indicator. If the authorization indicator is positive, then the transaction was authorized, and the virtual terminal may then display a confirmation screen and provide (via print, email, or SMS) a receipt of the transaction to the consumer. The merchant may additionally provide the requested product to the consumer.

Figure 4:
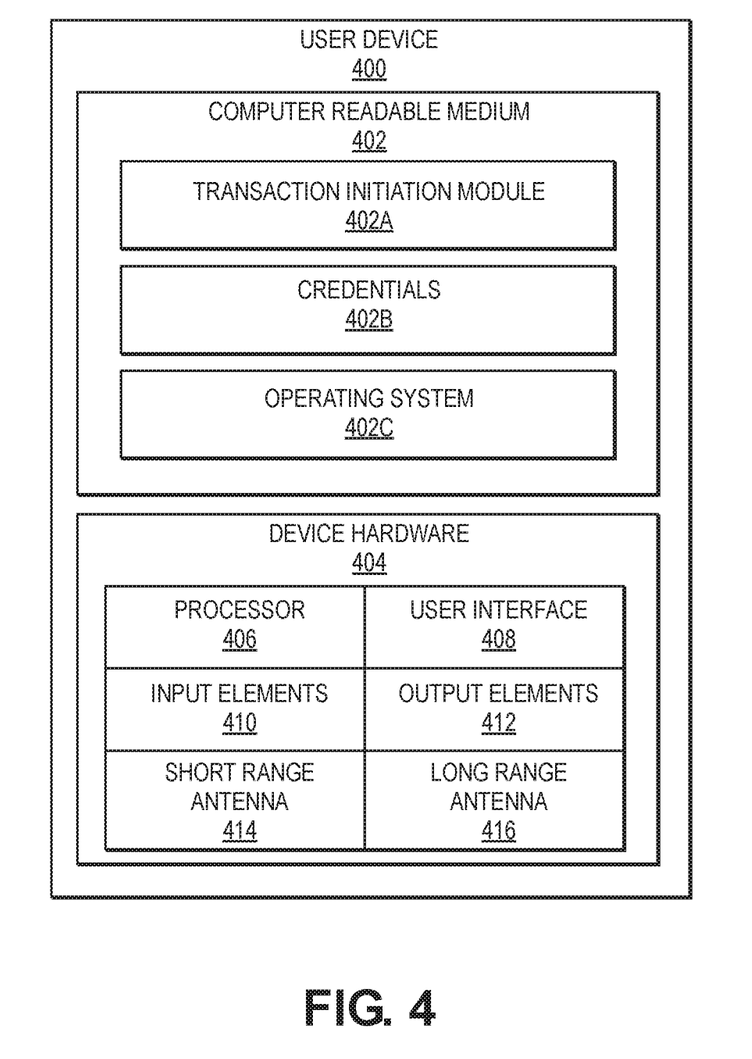
FIG. 4 shows an exemplary user device, according to one embodiment of the invention.

FIG. 4 shows a block diagram of an exemplary user device 400 that can be used in embodiments of the invention. The user device may primarily be used to store access credentials of a consumer, and may be a phone, a tablet, a payment card, and/or any other suitable device configured for communication with a device reader connected to a resource provider computer.

The user device 400 may comprise a computer readable medium 402, which can be in the form of (or may be included in) a memory element that stores data and can be in any suitable form (e.g., microSD chip, SIM card, or other type of memory element). The computer readable medium 402 may store a transaction initiation module 402A, credentials 402B, and an operating system 402C for the device. The transaction initiation module 402A may begin a transaction at the request of a user or in response to an interaction (e.g., tapping, inserting, or swiping) with a device reader. Credentials 402B may store at least a primary account number (PAN) that has been issued by an issuer server computer for the user.

The user device 400 may further include some device hardware 404, comprising at least: a processor 406, a user interface 408, input elements 410, and/or output elements 412. The device hardware 404 may also include a short range antenna 414 and a long range antenna 416 for communicating with a wireless network and/or other devices. All elements in the device hardware 404 are operatively coupled, enabling mutual communication and data transfer.

Figure 5:
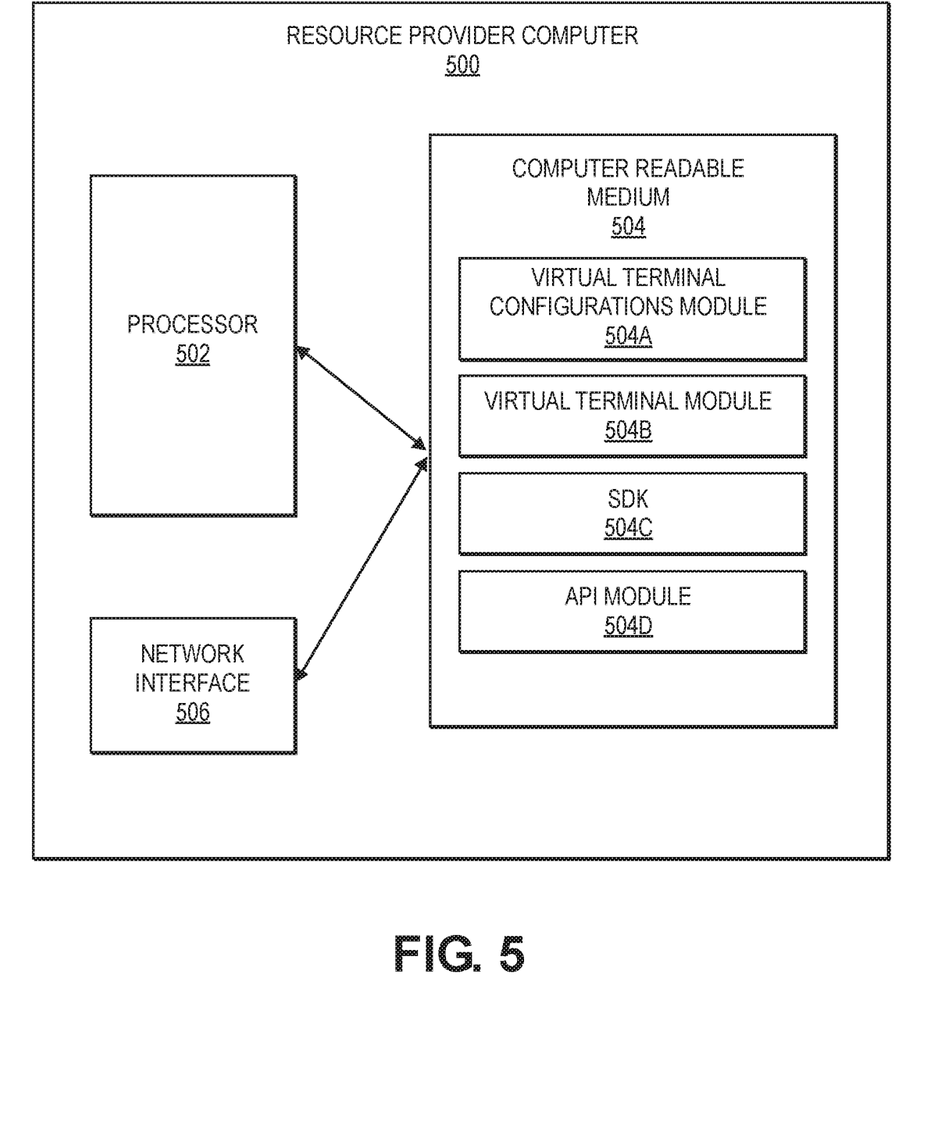
FIG. 5 shows an exemplary resource provider computer comprising a virtual terminal, according to one embodiment of the invention.

FIG. 5 shows a block diagram of an exemplary resource provider computer 500 comprising a virtual terminal in accordance with embodiments of the invention. The resource provider computer 500 may include a processor 502 coupled to a non-transitory computer readable medium 504 and a network interface 506 for receiving and transmitting messages to other entities (e.g., a device reader or a user device). In some embodiments, the network interface 506 may additionally receive and transmit messages to one or more server computers associated with a plurality of APIs that are in communication with the virtual terminal.

The processor 502 may include one or more microprocessors to execute program components for performing the functions of the non-transitory computer readable medium 504 such as retrieving configuration data, generating transaction requests and/or token requests, and receiving transaction responses and/or token responses.

The non-transitory computer readable medium 504 may comprise a virtual terminal configurations module 504A, a virtual terminal module 504B, a SDK 504C, and an API module 504D. The virtual terminal configurations module 504A may store one or more configurations for a virtual terminal, and can be manually updated by a merchant.

The virtual terminal module 504B may additionally comprise a Web browser 508 that is configured to receive transaction data and payment credentials. The Web browser 508 may consist of a secure user interface that displays product information and a value such as a transaction amount for a selected product(s) when a user initiates a transaction with the transaction. The browser 508 may additionally consist of one or more data fields for payment information, such as a PAN, and user information, such as a billing or shipping address.

SDK 504C may include a set of libraries or software tools that can facilitate communication between the virtual terminal module 504B and a device reader (as described in FIG. 1). The API module 504D may comprise a plurality of APIs, such as a configurations API, a token service API, and a transaction API that can be used to facilitate communication between the virtual terminal module 504B and one or more other applications and/or server computers.

The non-transitory computer readable medium 504 may additionally store code executable by the processor for implementing a method comprising at least: receiving, by a virtual terminal, virtual terminal configuration data from a virtual terminal configuration data source via a virtual terminal configurations API; transmitting, by virtual terminal, to a device reader, a value; receiving, by the virtual terminal, access data from a user device via the device reader; transmitting, by the virtual terminal, a transaction request comprising at least the value and the access data to a transaction platform via a transaction API; and receiving, by the virtual terminal, a transaction response from the transaction platform via the transaction API.

Embodiments of the invention have a number of technical advantages. As noted by the above examples, embodiments of the invention enable isolation of multiple elements of a virtual terminal, which allows for modifications to be made to one element of the multiple elements without necessitating an update to each of the multiple elements of the virtual terminal. For example, changes can be made to a user interface (e.g., to the Web browser) of the virtual terminal via the virtual terminal configurations API without affecting the payments infrastructure or the SDK of the virtual terminal. As another example, a payments system can also be changed without updating the SDK, because the changes only need to be made within the transaction API and (in some embodiments) the user interface of the virtual terminal.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a virtual terminal, virtual terminal configuration data from a virtual terminal configuration data source via a virtual terminal configurations API;
transmitting, by virtual terminal, to a device reader, a value;
receiving, by the virtual terminal, access data from a user device via the device reader:
transmitting, by the virtual terminal, a transaction request comprising at least the value and the access data to a transaction platform via a transaction API; and
receiving, by the virtual terminal, a transaction response from the transaction platform via the transaction API.

2. The method of claim 1, wherein the access data is an access token.

3. The method of claim 1, wherein the access data is a real credential.

4. The method of claim 1, wherein the virtual terminal is on a resource provider computer, which also comprises a software development kit (SDK) that encrypts the access credential using a symmetric or asymmetric encryption key.

5. The method of claim 4, wherein the SDK digitally signs the encrypted access credential to form a digital signature and a browser plug-in in the virtual terminal validates the digital signature before further processing the encrypted access credential.

6. The method of claim 1 further comprising:
responsive to receiving the access data from the user device via the device reader, transmitting a token request message comprising the access credential to a token provider computer via a token service API; and
receiving a token response message comprising an access token from the token provider computer via the token service API.

7. The method of claim 1, wherein the virtual terminal configuration data source is a configurations application stored on a resource provider computer running the virtual terminal.

8. The method of claim 1, wherein the virtual terminal is operated by a resource provider.

9. The method of claim 1, wherein the user device is a card.

10. The method of claim 1, wherein the user device is a mobile phone.

11. A system comprising:
a resource provider computer comprising
one or more processors,
one or more non-transitory computer readable medium, the one or more non-transitory computer readable medium comprising instructions which can be executed by the one or processors to:
receive, by a virtual terminal, virtual terminal configuration data from a virtual terminal configuration data source via a virtual terminal configurations API;
transmitting, by virtual terminal, to a device reader, a value;
receiving, by the virtual terminal, access data from a user device via the device reader:
transmitting, by the virtual terminal, a transaction request comprising at least the value and the access data to a transaction platform via a transaction API; and
receiving, by the virtual terminal, a transaction response from the transaction platform via the transaction API.

12. The system of claim 11, wherein the transaction API Is programmed to communicate with the transaction platform.

13. The system of claim 12, wherein the instructions further comprise:
transmitting a token request via token request API to a token server computer.

14. The system of claim 13, wherein the instructions further comprise receiving a token response via the token request API from the token server computer.

15. The system of claim 12, wherein the transaction platform comprises a transport computer.

16. The system of claim 11, wherein the resource provider computer comprises an SDK that interfaces with the virtual terminal.

17. The system of claim 16, wherein the SDK is programmed to perform encryption and decryption.

\* \* \* \* \*